Dec. 16, 1958 J. P. GLEASON 2,864,949

CIRCUIT FOR PRODUCING LINEAR SWEEP POTENTIAL

Filed Nov. 8, 1954

INVENTOR.
J. P. Gleason
BY [signature]
ATTORNEY

United States Patent Office 2,864,949
Patented Dec. 16, 1958

2,864,949

CIRCUIT FOR PRODUCING LINEAR SWEEP POTENTIAL

Joseph P. Gleason, Encino, Calif., assignor to Bendix Aviation Corporation, North Hollywood, Calif., a corporation of Delaware Application November 8, 1954, Serial No. 467,485

8 Claims. (Cl. 250—27)

Figure 1:
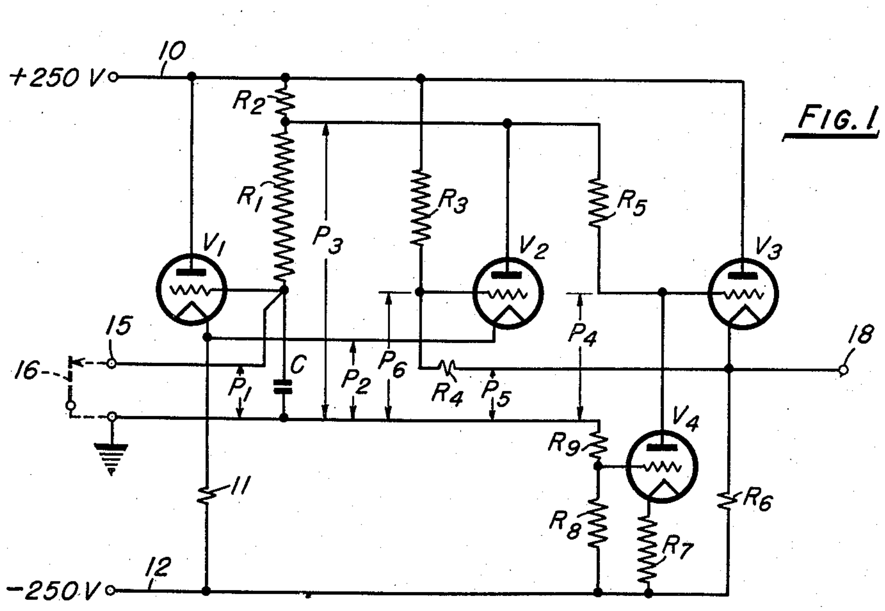

This invention relates to circuits for producing a potential that rises at a uniform rate (linearly) with time and is particularly useful as a source of sweep potential for a cathode ray tube.

An object of the invention is to provide a uniformly rising potential of relatively long duration with a simple, practicable and reliable circuit.

Other more specific objects and features of the invention will appear from the description to follow.

The basis of most sweep circuits is a condenser that is charged through a resistance. It is well known that if a condenser is charged with a constant current, its potential will rise linearly with time. It is also well known that if a condenser is charged through a fixed resistor from a current source of constant potential, the current in the resistor is not constant, but varies exponentially, and the potentials across the condenser and across the resistor also vary exponentially. To obtain a constant charging current, the potential applied to the resistor must rise at the same rate as the potential across the condenser, and various circuits have been developed for accomplishing this. Previous circuits, as known to me, have involved a second condenser. A practical limitation of such circuits is that when a rising potential of long duration is to be obtained, the second condenser must be large, and it becomes impracticable to use them to generate sweep potentials of very long duration.

In accordance with the present invention, I control the potential applied to the resistor with an amplifier responsive to the potential drop across the resistor. With a high gain amplifier, it is practicable to maintain the potential drop across the resistor within very close limits, so that the rise of potential across the condenser is practically linear.

Figure 2:
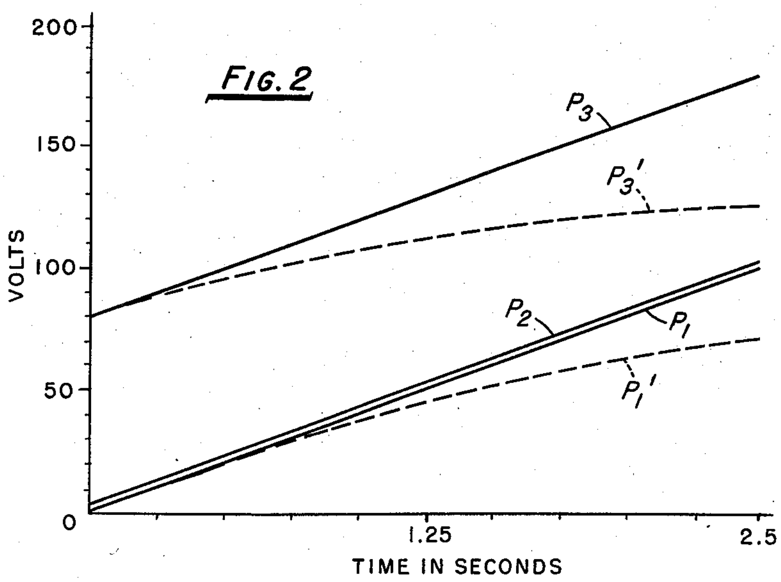

A full understanding of the invention may be had from the following detailed description with reference to the drawing, in which:

Fig. 1 is a schematic diagram of a circuit in accordance with the invention, and Fig. 2 is a table of curves illustrating the operation of the circuit.

Referring to Fig. 1, the invention comprises a condenser C connected in series with two resistors R1 and R2, respectively, between ground and a supply line 10 of positive potential. The junction of the condenser C and resistor R1 is connected to an input terminal 15 which is normally connected to ground by any suitable control circuit (here shown as a switch 16). While the terminal 15 is grounded, the potential P1 across the condenser C is zero, and the potential P3 at the junction between resistors R1 and R2 is at a constant value. To start a cycle of operations, the terminal 15 is disconnected from ground, as by opening switch 16, whereupon the condenser C charges through the resistors R1 and R2. If the remainder of the circuit were eliminated, the condenser C would charge with an exponentially reducing current, and the potentials P1 and P3 would rise exponentially as shown by the curves P1′ and P3′ of Fig. 2.

To obtain a linearly rising potential, the current in R1 must be maintained constant, and I accomplish this with vacuum tubes V1, V2, V3 and V4 and their related circuits.

The vacuum tube V2 is a high gain amplifier, shown as a triode, having its anode connected to the junction of R1 and R2 so that the total current through R2 can be varied by changing the current through tube V2 (to maintain a constant current in R1). Since a constant current in R1 produces a constant potential thereacross, the current drawn by tube V2 can be varied in accordance with changes in the potential across R1, which potential is the difference between potentials P3 and P1. I accomplish this by causing the cathode of tube V2 to follow the potential P1 and causing the grid of V2 to follow potential P3.

As used herein, the statement that one potential follows another means that they are of different magnitudes but vary together so that the arithmetic difference between them is always constant.

The cathode of tube V2 is caused to follow the potential P1 by connecting it directly to the cathode of tube V1 which is connected as a cathode follower having its anode directly connected to the positive potential line 10, having its cathode connected through a coupling resistor 11 to a negative supply line 12, and having its grid connected to the junction between condenser C and resistor R1. The potential P2 of the cathodes of tubes V1 and V2 therefore varies directly with the potential P1 within very close limits.

A slightly more complicated circuit is necessary to cause the grid of tube V2 to follow the potential P3 at the upper end of resistor R1. Thus the upper end of resistor R1 is connected through a resistor R5 to the grid of a second cathode follower tube V3 and through the tube V4 and a resistor R7 to the negative line 12. The circuit including the resistor R5, tube V4 and resistor R7 applies to the grid of tube V3 a potential that varies with potential P3 but is of lower magnitude by a constant value.

This is accomplished by producing, with the tube V4, a substantially constant current in R5, irrespective of variations in the potential P3. To this end, the tube V4 has a very high amplification factor and has its grid maintained at constant potential by connecting it to the tap on a potentiometer circuit consisting of resistors R8 and R9 connected between the negative supply line 12 and ground. The resistor R7 is of relatively large magnitude and of such value relative to the resistor R5 and the resistors R8 and R9 as to maintain the V4 tube current at the desired value. With this arrangement, any slight increase in current through the resistor R7 derives the cathode of V4 in a positive direction with respect to the grid, thereby increasing the impedance of the tube and keeping the current increase within very narrow limits. On the other hand, if the current in R7 tends to decrease, the cathode of V4 becomes more negative with respect to the grid, reducing the impedance of the tube to narrowly limit the extent of the current decrease. By maintaining the current through R5 substantially constant in the manner described despite variations in the potential P3, the potential P4 applied to the grid of the cathode follower V3 follows the potential P3 closely, but has a lower value equal to the voltage drop across resistor R5 in response to the constant current therethrough.

The anode of cathode follower V3 is directly connected to the positive line 10, and the cathode is connected through a coupling resistor R6 to the negative line 12. The potential P5 of the cathode of tube V3 is applied to the output terminal 18 and is also applied through a small resistor R4 to the grid of tube V2 which is connected by a relatively large resistor R3 to the positive line 10. The potential of the grid of tube V2 therefore changes with the potential P3 at the upper end of resistor R1, whereas, as previously pointed out, the potential P2 applied to the cathode of V2 follows the potential P1 at the lower end of resistor R1.

So long as the potentials P1 and P3 rise in unison at the same rate, the potentials of the cathode and grid of tube V2 rise together, and the conductivity of tube V2 remains substantially unchanged.

However, as previously pointed out, the potentials P1 and P3 tend to rise exponentially as shown in the curves P1' and P3' in Fig. 2, which tends to diminish the difference between potentials P1 and P3 with time. This brings the potentials of the cathode and grid of tube V2 farther apart, reducing the gain of this tube and decreasing the current it draws through resistor R2. A very slight percentage change in the potential across resistor R1 produces a large change in the anode current of the tube V2, producing a reduced potential drop in resistor R2 that causes potential P3 to rise substantially in unison with the rise in potential P1 across the condenser C. This maintains the current in resistor R1 substantially constant, and the voltages P1 and P3 vary in substantially linear fashion, as shown by curves P1 and P3 in Fig. 2. The potential P1 is reproduced by the cathode follower V1 as the linearly rising potential P2 at the cathode of tube V2. It will be observed from Fig. 2 that the curves P1 and P2 are only slightly displaced from each other and are substantially straight and parallel. Only a very small change in the potential between the cathode and grid of tube V2 is necessary to change the anode current of this tube sufficiently to maintain the potentials P1, P2 and P3 in linearly rising direction. Therefore although potential P6 diverges slightly from potential P2 as the cycle progresses the divergence is too slight to show in the graph of Fig. 2. For this reason a curve of potential P6 has not been included in Fig. 2, but it would fall between curves P1 and P2. Since the potential P5 at the output terminal 18 follows the potential P6, which substantially follows potentials P2 and P1, potential P5 substantially follows potential P1.

In the circuit the characteristics of which are shown by the graphs in Fig. 2, the circuit elements had the following values:

| | |
|---|---|
| R1 | 1000K |
| R2 | 75K |
| R3 | 470K |
| R4 | 5.6K |
| R5 | 172K |
| R6 | 68K |
| R7 | 330K |
| R8 | 160K |
| R9 | 82K |
| C | 2.0μ |
| V1 | 6072 |
| V2 | 6072 |
| V3 | 5670 |
| V4 | 5751 |

An important advantage of the invention is that the output impedance of the circuit (looking at 18) is very low. This means that the external load driven by 18 can be changed by a relatively large amount without introducing appreciable errors in the sweep. The fact that the output is taken from a cathode follower helps to lower the output impedance, but the feedback system lowers the impedance much more.

Summarizing, the invention in its broadest aspect resides in the combination of the CR circuit consisting of the resistance element R1 and condenser C connected in series with a potential source, and means for producing a potential proportional to the error in the potential drop in the resistance element, amplifying it, and using it to vary the total voltage applied across the CR circuit in unison with the voltage rise in the condenser as it charges. In Fig. 1, this means includes the resistor R2, the amplifier V2 for decreasing the current through R2 in response to a decrease in the potential difference between its input terminals (cathode and grid), the cathode follower V1 for applying to the cathode of V2 a potential following the potential at the lower end of R1, and the resistor R5, constant current tube V4, and cathode follower V3 for applying to the grid of V2 a potential following the potential at the upper end of resistor R1.

Although for the purpose of explaining the invention a particular embodiment thereof has been shown and described, obvious modifications will occur to a person skilled in the art, and I do not desire to be limited to the exact details shown and described.

I claim:

1. Apparatus of the type described comprising: a capacitance-resistance circuit consisting of a condenser and resistance element connected in series; a potential source; switching means; circuit means responsive to actuation of said switching means for connecting said source to said capacitance-resistance circuit to charge said condenser through said resistance element; a high gain amplifier having input terminals and output terminals; means connecting said amplifier output terminals to said charging circuit means to increase the potential across said capacitance-resistance circuit in response to a reduction of potential across said input terminals; a first means for deriving and applying to one input terminal of said amplifier a potential following the potential at one end of said resistance element, and a second means for deriving and applying to the other input terminal a potential following the potential at the other end of said resistance element.

2. Apparatus according to claim 1 in which said one end of said resistance element is of lower potential than said other end, and said first means comprises a cathode follower circuit comprising a vacuum tube having a cathode, anode and grid with a source of energizing potential and a cathode coupling resistor connected between its anode and cathode and having its grid connected to said one end of said resistance element and its cathode connected to said one input terminal.

3. Apparatus according to claim 2 in which said second means comprises a second cathode follower circuit having its cathode connected to said other input terminal and means for applying to the grid of said second cathode follower circuit a potential lower than, but following, the potential of the other end of said resistance element.

4. Apparatus according to claim 3 in which said last-mentioned means comprises a resistor connecting said other end of said resistance means to the grid of said second cathode follower and means for maintaining a constant current in said resistor.

5. A sweep voltage generator comprising: a source of unidirectional potential having positive and negative terminals; a first resistor having positive and negative ends; a second resistor connecting said positive source terminal to said positive end of said first resistor; a condenser connecting said negative source terminal to said negative end of said first resistor; means for discharging siad condenser to enable it to recharge from said source through said resistors; a high gain amplifier having a cathode, anode and control grid; means connecting said anode to said positive end of said first resistor and said cathode to said negative terminal whereby current traversing said second resistor divides between said first resistor and said amplifier; means for maintaining said cathode at a constant potential with respect to said negative end of the first resistor, and means for maintaining said grid at a potential constant with respect to said positive end of the first resistor, whereby variation of the charging current through said first resistor varies the potential between said grid and cathode in direction to inversely vary the cathode-anode resistance of said amplifier.

6. Apparatus according to claim 5 in which said means for maintaining said cathode at a constant potential with respect to said negative end of the first resistor comprises a cathode follower tube having an anode connected to said positive terminal, a grid connected to said negative end of the first resistor, and a cathode connected to the cathode of said amplifier; and a circuit including a coupling resistor connecting said cathodes to said negative source.

7. Apparatus according to claim 5 in which said means for maintaining said grid at a potential constant with respect to said positive end of the first resistor comprises a third resistor having one end connected to said positive end of said first resistor; a second source of unidirectional potential having a positive terminal connected to the negative terminal of said first-mentioned source; a constant current device connecting the negative terminal of said second source to the other end of said third resistor; and means for maintaining said grid of said amplifier at a constant potential with respect to said other terminal of said third resistor.

8. Apparatus according to claim 7 in which said last-mentioned means comprises a cathode follower tube having an anode connected to said positive terminal of said first-mentioned source, a grid connected to said other end of saisd third resistor, and a cathode connected to said grid of said amplifier; and a coupling resistor connecting said cathode follower cathode to said negative terminal of said second source.

References Cited in the file of this patent

UNITED STATES PATENTS

| | | |
|---|---|---|
| 2,426,256 | Zenor | Aug. 26, 1947 |
| 2,439,324 | Walker | Apr. 6, 1948 |
| 2,462,024 | Johnson | Feb. 15, 1949 |
| 2,554,172 | Custin | May 22, 1951 |